US008392712B1

(12) United States Patent
Wilson

(10) Patent No.: US 8,392,712 B1
(45) Date of Patent: Mar. 5, 2013

(54) SYSTEM AND METHOD FOR PROVISIONING A UNIQUE DEVICE CREDENTIAL

(75) Inventor: David Wilson, Mountain View, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/439,705

(22) Filed: Apr. 4, 2012

(51) Int. Cl.
H04L 29/06 (2006.01)
(52) U.S. Cl. .......................................... 713/175
(58) Field of Classification Search .................. None
See application file for complete search history.

(56) References Cited

U.S. PATENT DOCUMENTS

| 5,418,854 | A * | 5/1995 | Kaufman et al. | 713/156 |
| 2003/0200437 | A1 * | 10/2003 | Oishi | 713/175 |
| 2009/0276848 | A1 * | 11/2009 | Suzuki et al. | 726/17 |
| 2011/0067092 | A1 * | 3/2011 | Baker et al. | 726/6 |

\* cited by examiner

Primary Examiner — David Pearson
(74) Attorney, Agent, or Firm — Blakely, Sokoloff, Taylor & Zafman LLP

(57) ABSTRACT

According to one embodiment of the invention, a method for controlling access to a network comprises a first operation of determining one or more device characteristics of an electronic device seeking to join the network. Then, one or more unique device credentials are generated for the electronic device. The format of the unique device credentials are based on the one or more device characteristics of the electronic device.

27 Claims, 10 Drawing Sheets

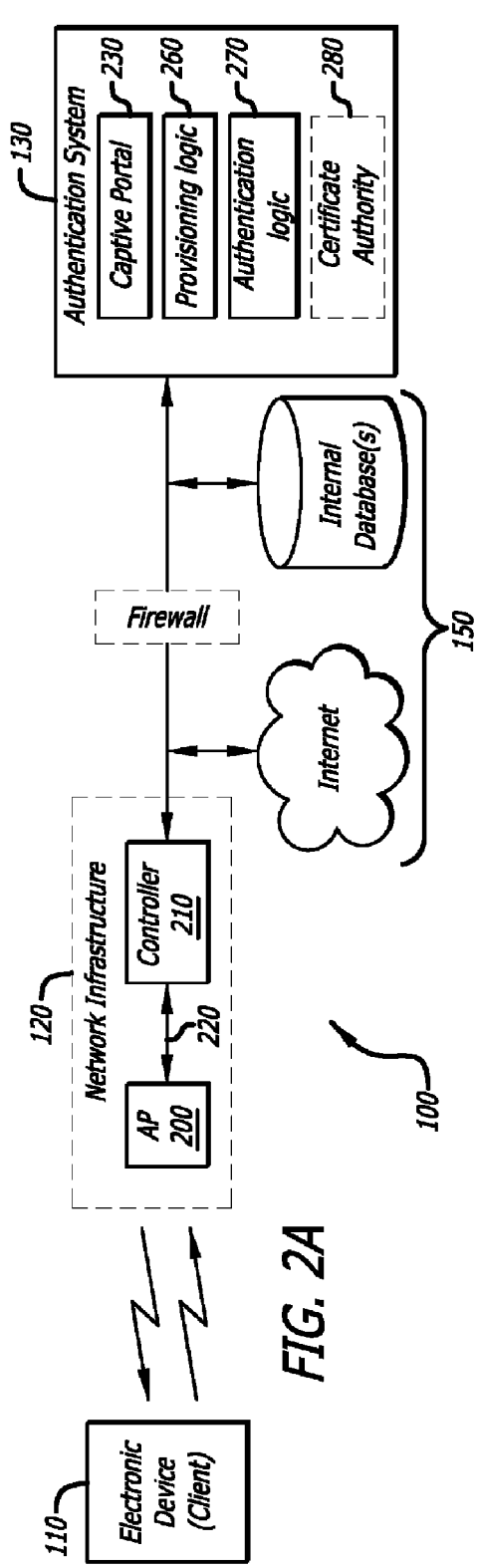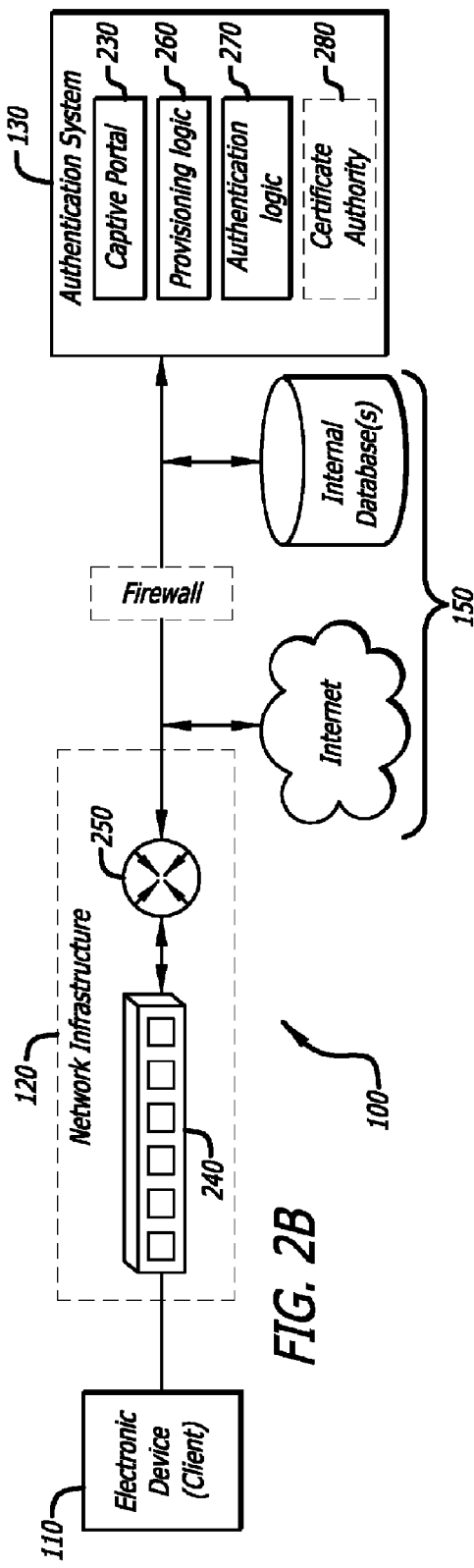

SYSTEM AND METHOD FOR PROVISIONING A UNIQUE DEVICE CREDENTIAL

FIELD

Embodiments of the present disclosure relate to the field of network communications, and in particular a system and method for identifying electronic devices in a dynamic environment and provisioning one or more unique device credentials to those devices for enabling secured communications.

BACKGROUND

Until fairly recently, wireless networks were configured to only support wireless devices that were pre-approved by a network administrator. Typically, this required an incoming guest to register her wireless device (e.g., laptop computer) with the network administrator. This was problematic because the normal registration process was quite labor intensive from an IT perspective and, in many cases, caused new guests to wait an unreasonable amount of time before a network administrator could register her laptop computer.

At that time, for device registration, the network administrator manually uploaded either the unique media access control (MAC) address of the laptop computer or its newly assigned identifier into a database. Tasked with the responsibility of controlling access to the wireless network, an authentication server accessed the database whenever a wireless device sought access to the wireless network. If the wireless device was registered, it was granted access to the wireless network. Otherwise, access was denied.

Recently, however, wireless networks are being adapted to support "Bring-Your-Own-Device" (BYOD) environments, where all users are able to access a targeted wireless network through their personal devices, such as laptop computers, tablets, or smartphones for example. As a result, the number of devices per network user has grown from a one-to-one relationship to a one-to-many relationship as a network user may simultaneously or interchangeably connect to a network using multiple devices.

Granting enterprise access to personal devices has direct implications on security and network control. Security challenges range from understanding who and what is connected to the network to keeping the network malware-free, including proper enforcement and compliance with access policies.

Currently, in supporting a BYOD networking environment, secure access to the network is provisioned through an authentication scheme that involves an exchange of digital certificates. However, certain types of wireless devices, most notably Android® based smartphones, are not suited for this type of authentication scheme. The reason is that Android® based smartphones appear to automatically accept any issued digital certificates, without issuing a request for user acceptance before releasing information pertaining to the smartphone. Thus, this device is susceptible to "man-in-the-middle" attacks, which can reduce the security of the network as a whole.

A method of provisioning unique device credentials in a universal manner for all device types or capabilities is strongly needed.

BRIEF DESCRIPTION OF THE DRAWINGS

Embodiments of the present disclosure are illustrated by way of example, and not by way of limitation, in the figures of the accompanying drawings and in which:

FIG. 2A is an exemplary block diagram of the network infrastructure within a wireless network that supports device credential provisioning.

FIG. 2B is an exemplary block diagram of the network infrastructure within a wired network that supports device credential provisioning.

DETAILED DESCRIPTION

Figure 1:
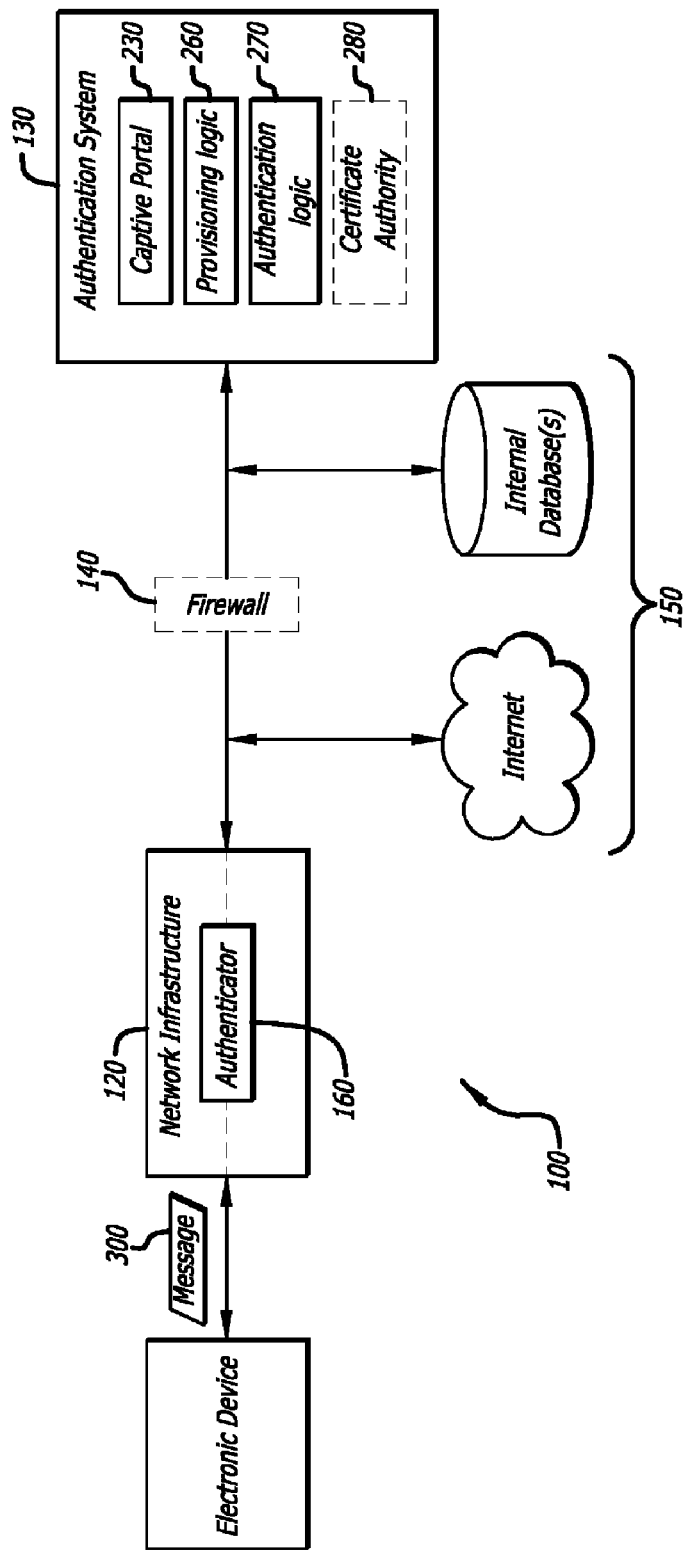
FIG. 1 is a general block diagram of a network with port-based network access control that features device credential provisioning and device credential authentication.

In the following description, several specific details are presented to provide a thorough understanding of the invention. While the context of the disclosure is directed to provisioning secure network access, one skilled in the relevant art may recognize, however, that the concepts and techniques disclosed herein can be practiced without certain details such as the exclusion of one or more operations, certain logic, or the like.

Herein, certain terminology is used to describe features for embodiments of the disclosure. For example, the term "electronic device" generally refers to any device that includes logic adapted to communicate with a network and/or process information related to such communications. Different categories of electronic devices may include, but are not limited or restricted to (1) a client device being any consumer electronics with network connectivity (e.g., tablet; laptop; desktop; netbook; television; set-top box; video gaming control; mobile handset with cellular and/or wireless connectivity such as a smartphone, personal digital assistant "PDA"; etc.); (2) an access point; (3) a data transfer device (e.g., network switch, router, controller, brouter, firewall, etc.); (4) an authentication server; or the like.

It is contemplated that an electronic device may include hardware logic, including one or more of the following: (i) processing circuitry; (ii) one or more communication interfaces such as radios (e.g., component that handles the wireless data transmission/reception) and/or physical connectors to support wired connectivity; and/or (iii) a non-transitory computer-readable storage media (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Additionally, the term "logic" is generally defined as hardware and/or software. As hardware, logic may include processing circuitry (e.g., a controller, a processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

The term "interconnect" is broadly defined as a logical or physical communication path such as, for instance, electrical wire, optical fiber, cable, bus trace, or a wireless channel using infrared, radio frequency (RF), or any other wireless signaling mechanism. The term "message" constitutes any grouping of data in the form of a packet, a frame, an Asynchronous Transfer Mode (ATM) cell, or any other series of bits having a prescribed format.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Certain details are set forth below in order to provide a thorough understanding of various embodiments of the invention, albeit the invention may be practiced through many embodiments other that those illustrated. Well-known logic and operations may not be set forth in detail in order to avoid unnecessarily obscuring this description. Moreover, the illustrated embodiments of the disclosure, and the description associated therewith, should be considered as examples of the principles of the invention and not intended to limit the disclosure to those specific embodiments. It should be understood that this disclosure covers all modifications, equivalents, and alternatives falling within the spirit and scope of the present disclosure.

General Network Architecture

Referring to FIG. 1, a general block diagram of a network 100 supporting multiple Basic Service Set Identifiers (BSSIDs) with port-based network access control that features device credential provisioning and device credential authentication is shown. According to this embodiment of the disclosure, network 100 is a local area network (LAN) with port-based network access control in accordance with Institute of Electrical and Electronic Engineers (IEEE) 802.1X entitled "Port Based Network Access Control" (2010). Such access control is adapted to provide security against an electronic device gaining unauthorized access to various network resources 150 (e.g., Internet, internal databases, etc.).

More specifically, authentication in accordance with the IEEE 802.1X Standard involves communications between (i) an electronic device seeking to join network 100 and (ii) certain components forming network 100, namely network infrastructure 120 and an authentication system 130. As shown, an optional firewall 140 may be positioned to isolate authentication system 130 from publicly accessible services. However, with respect to the operational flow described below, firewall 140 will not be discussed.

As illustrated, network infrastructure 120 is a collection of electronic devices that is adapted to support communications between authentication system 130 and the electronic device (e.g., client device). Moreover, network infrastructure 120 is adapted to initially restrict access to network resources 150 until the identity of client device 110 has been authenticated. The components formulating network infrastructure 120 may vary, depending on the selected network architecture.

For instance, as shown in FIG. 2A, where network 100 is a wireless local area network (WLAN), network infrastructure 120 comprises an access point (AP) 200 that is coupled to controller 210 over interconnect 220. Herein, AP 200 is configured to establish communications with wireless electronic devices within its coverage area such as client device 110 for example. Controller 210 is configured to monitor messages received by AP 200 from client device 110 and determine what "role" is to be assigned to client device 110. In other words, controller 210 assigns client device 110 to a specific role (e.g. network access level), which may partially or completely restrict access by client device 110 to network resources 150 until the identity of client device 110 has been authenticated. As an example, controller 210 may restrict access to network resources 150 by redirecting certain messages from client device 110 to a Captive Portal instance 230 supported by authentication system 130.

Alternatively, as shown in FIG. 2B, where network 100 is a local area network (LAN) supporting wired connectivity with client device 110, network infrastructure 120 comprises one or more data transfer devices, such as manageable switch 240 (e.g. 802.1X switch) and router 250, that also determine a particular role for client device 110. Where client device 110 is attempting to join network 100 for the first time, manageable switch 240 assigns client device 110 to a provisioning role, which may trigger redirection of certain messages from client 110 to Captive Portal instance 230 until the identity of client device 110 has been authenticated.

Referring back to FIG. 1, after a communication path has been established with client device 110, an electronic device within network infrastructure 120, such as controller 210 or switch/router 240 and 250 (hereinafter generally referred to as an "authenticator" 160), may perform device fingerprinting. "Device fingerprinting" involves the monitoring of initial messages transmitted by client device 110 to determine whether client device 110 has been previously authenticated.

One type of "device fingerprinting" involves analysis of contents within a Dynamic Host Configuration Protocol (DHCP) Options field of a DHCP Discovery message. Client device 110 broadcasts a DHCP Discovery message in efforts to obtain an Internet Protocol (IP) address for use on network 100. In many cases, the content within the DHCP Options field suggests capabilities (e.g., information directed to functionality of the device such as operating system used, authentication protocol(s) supported, etc.) and/or type of device (e.g., information to identify the device such as manufacturer name, product name, etc.), which may assist authenticator 160 in determining whether client device 110 should be placed into a provisioning role. Herein, the device capabilities and/or device type information, which are explicitly identified or inferred, may be generally referred to as "device characteristics".

More specifically, if authenticator 160 is unable to recognize an identity of client device 110 as the device characteristics is not identifiable, client device 110 is placed into a provisioning role, which restricts its access to network resources 150 and, in some cases, may trigger communications with Captive Portal instance 230 for subsequent requests for access to network resources 150.

Another type of "device fingerprinting" may involve authenticator 160 gaining access to a media access control (MAC) address of client device 110. This may be accomplished by extracting the source MAC address from signaling originating from client device 110. The MAC address of control device 110 is compared to stored MAC addresses for devices that have been previously authenticated. If the MAC address of client device 110 fails to match any of the stored MAC addresses, authenticator 160 places client device 110 into a provisioning role.

It is contemplated that the stored MAC addresses for previously authenticated client devices may be contained within a MAC table, which is updated at a periodicity selected by the network administrator. Hence, if there is no activity from one of the client devices for a predetermined period of time, the MAC address of that device is removed from the MAC table.

Yet another type of "device fingerprinting" may involve authenticator 160 comparing a username provided during an initial message exchange between client device 110 and authentication system 130. The username provided by control device 110 may be compared to active usernames that are used by previously authenticated electronic devices and stored within network infrastructure 120 and/or authentication system 130.

Once client device 110 has been assigned a provisioning role, namely the device is substantially restricted (or precluded) from accessing network resources 150, any messages from device 110 may be redirected by authenticator 160 to Captive Portal instance 230 located in authentication system 130. The redirected messages are for those situations where client device 110 has not been authenticated which, in some situations, may be due to the lack of provisioning of one or more unique device credentials (hereinafter referred to as "device credential(s)") to client device 110.

As an illustrative example, in response to a message 300 (e.g., HTTP Get Request message) from client device 110 placed in a provisioning role, authenticator 160 redirects the message to Captive Portal instance 230 provided by authentication system 130. Provisioning logic 260 within authentication system 130 analyzes the message to determine device characteristics for client device 110 and infers its capabilities.

Figure 3:
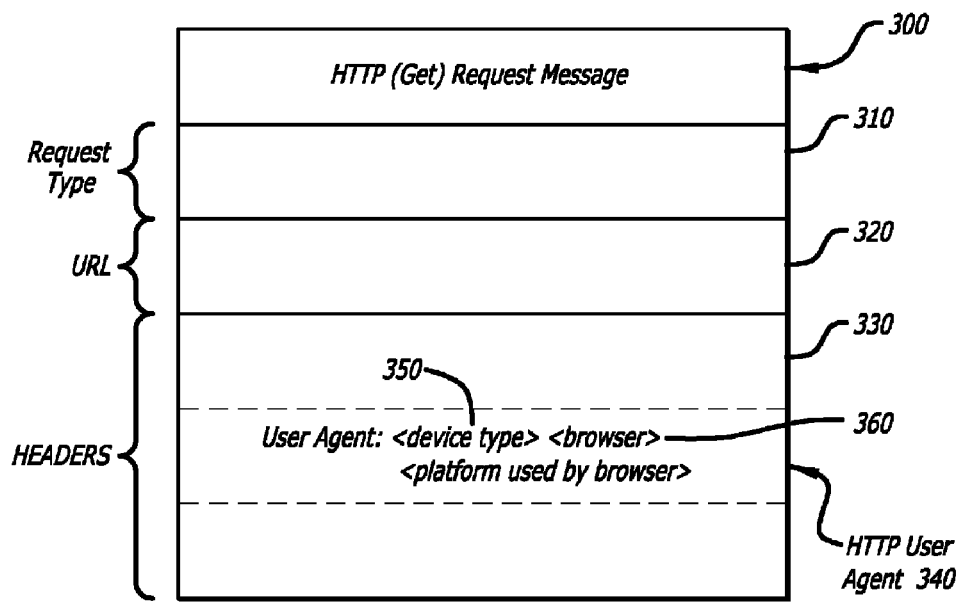
FIG. 3 is an exemplary diagram of Request message issued by a requesting electronic device commencing a Provisioning Stage for obtaining unique device credentials.

As shown in FIG. 3, HTTP GET Request message 300 comprises a plurality of information fields including, but not limited or restricted to (1) Request Type 310 (e.g., GET, etc.), (2) requested uniform resource locator (URL) 320 (e.g., www.name.com) and (3) headers 330 including an HTTP User Agent header 340. "HTTP User Agent" header 340 is used to identify a source of the HTTP GET Request (e.g. client device 110). HTTP User Agent header 340 comprises a number of subfields including, but not limited or restricted to (i) device characteristics 350, (ii) browser information 360, or the like. Information within HTTP User Agent header 340 is used to infer what type of unique device credential is supported by client device 110.

Referring back to FIG. 1, based on device information received from the incoming message from client device 110, provisioning logic 260 within authentication system 130 initiates a device credential provisioning scheme to (1) determine the device characteristics for client device 110 and (2) provision (provide) unique device credentials based on the device characteristics. For instance, where client device 110 is an Apple® platform (e.g., iPhone™, iPad™, etc.) and is adapted with capabilities to support certificate-based authentication protocols (e.g. Extensible Authentication Protocol-Transport Layer Security or "EAP-TLS"), provisioning logic 260 provides a first type of unique device credential (e.g., digital certificate) to client device 110.

However, where client device 110 is configured to support an authentication protocol other than a certificate-based authentication protocol, such as a username/password based authentication protocol (e.g., Protected Extensible Authentication Protocol "PEAP", EAP-MD5, EAP-GTC, etc.), provisioning logic 260 provides another type of unique device credential (e.g., username and password) to client device 110. According to one embodiment of the invention, this unique device credential is information derived from a digital certificate generated for and corresponding to client device 110 as described below.

Upon receipt, the unique device credential is stored and provided by client device 110 during an Authentication Stage when it is attempting to connect to network 100.

Figure 2C:
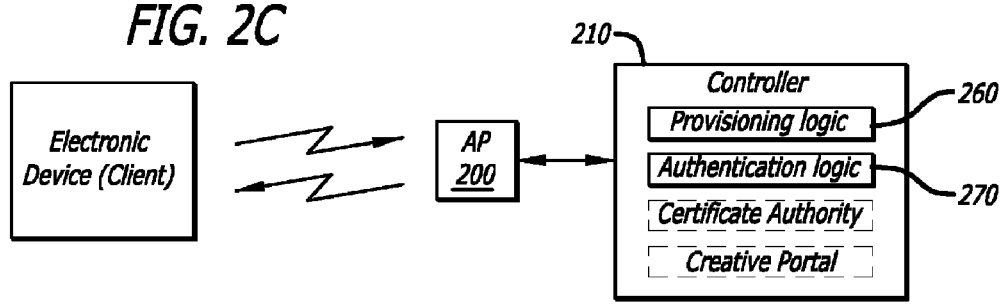
FIG. 2C is another exemplary block diagram of a network that supports device credential provisioning and device credential authentication.

Referring now to FIG. 2C, another detailed exemplary block diagram of network 100 supporting device credential provisioning and device credential authentication is shown. Herein, in lieu of relying on authentication system 130 to provision unique device credentials to client device 110, controller 210 handles such operations. This requires controller 210 to be adapted to with provisioning logic 260 and authentication logic 270 in order to (i) determine the device characteristics of client device 110, (ii) provision unique device credential(s) based on this determination, and (iii) authenticate the device credential(s).

Figure 2D:
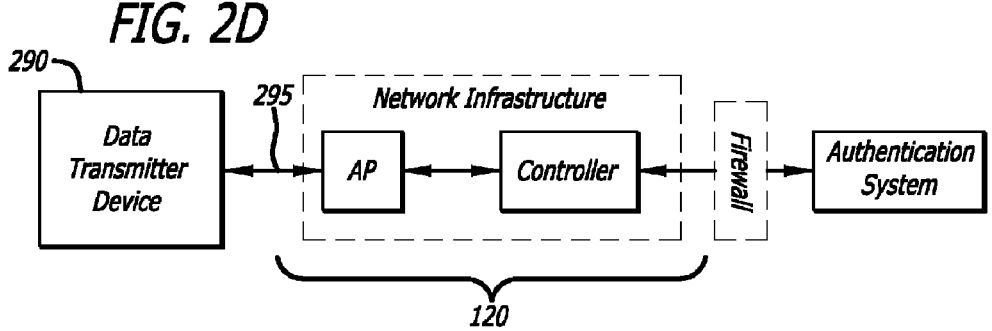
FIG. 2D is another exemplary block diagram of a network that supports device credential provisioning to a data transfer device and device credential authentication.

Referring to FIG. 2D, another detailed exemplary block diagram of network 100 supporting device credential provisioning and device credential authentication is shown. Herein, the electronic device constitutes a data transfer device 290 (e.g., switch, router, etc.) is physically coupled via interconnect 295 to an available port on network infrastructure 120. Therefore, a variety of electronic devices other than client devices, such as an access point (AP) or data transfer device 290 (as shown) for example, may be initially set into a provisioning role and subsequently awarded a unique device credential for use in authentication as described below.

Operational Flow for Unique Device Credential Provisioning

In order to provision secure network access for any device attempting to access the network, regardless of device characteristics, three (3) operational stages are conducted by the authentication system. The first operational stage, referred to as "Pre-Provisioning Stage," involves operations by the authentication system to learn the device characteristics for electronic device attempting to join a network. The second operational stage, referred to as "Provisioning Stage," involves the operation by the authentication system to provide unique device credential(s) to the electronic device for use during the Authentication stage (described below).

Lastly, the third operational stage, referred to as "Authentication Stage," involves operations by the authentication system to receive unique device credential(s) from the electronic device and, where appropriate, to authenticate the electronic device. Upon receipt of the unique device credential(s), the authentication system determines (i) whether the device credential(s) is(are) valid, (ii) whether the electronic device is authorized to join the network, and if so (iii) what access restraints, if any, are to be imposed on its network connectivity.

A. Pre-Provisioning Stage

Figure 4:
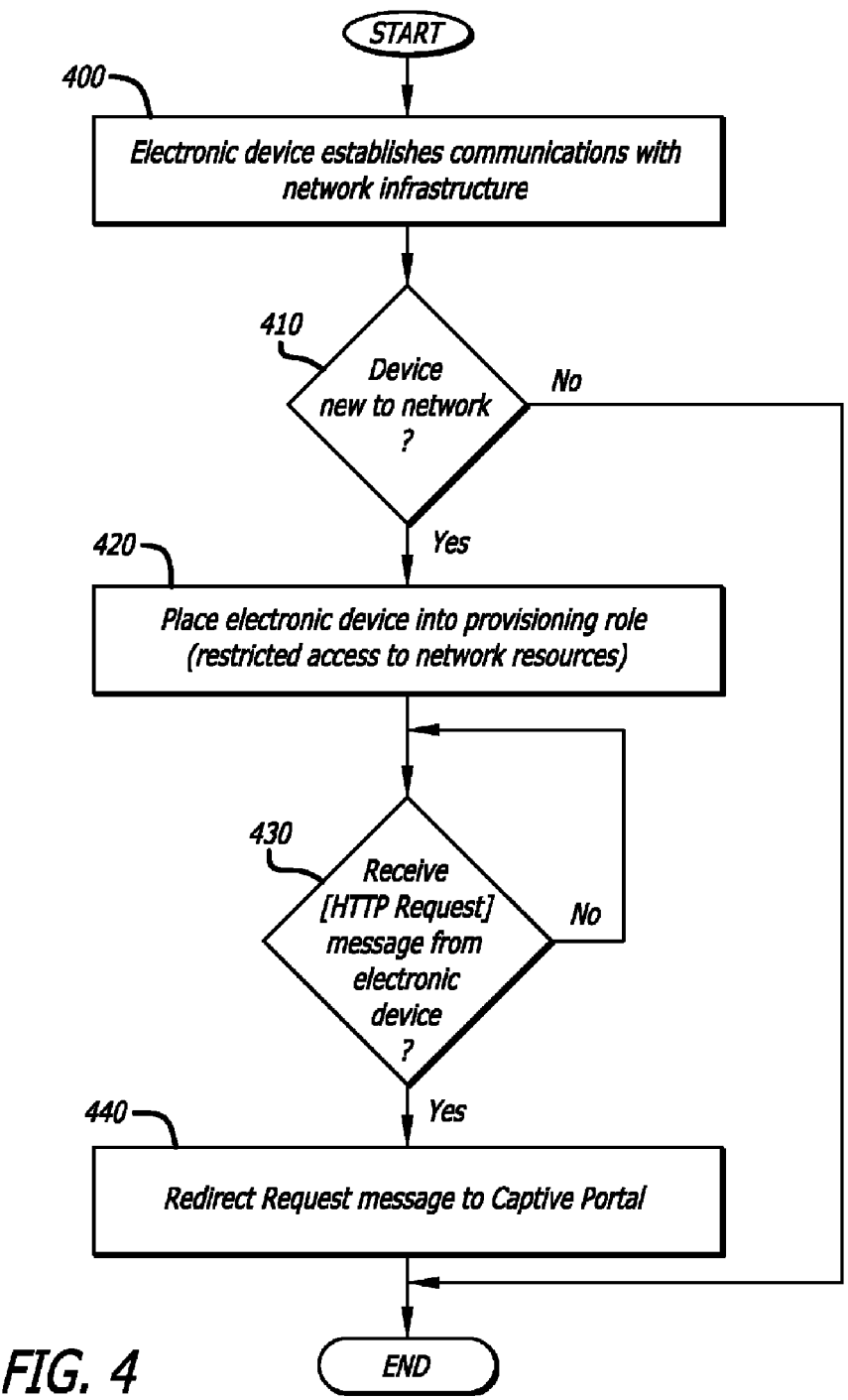
FIG. 4 is an exemplary flowchart of operations of a Pre-Provisioning Stage in order to gather information necessary to provision unique device credentials to a newly identified electronic device.

Referring to FIG. 4, an exemplary flowchart of operations of this Pre-Provisioning Stage in order to gather information necessary to provision unique device credential(s) to a newly identified electronic device is shown. Initially, an electronic device establishes communications with network infrastructure providing connectivity to the network (block 400). For instance, as an illustrative example, if the network is a wireless local area network (WLAN) as set forth in FIG. 2A, the electronic device detects beacon signals from an access point (AP) within the network and associates with that AP. The association may involve the exchange of PROBE REQUEST/PROBE RESPONSE messages and ASSOCIATION REQUEST/ASSOCIATION RESPONSE messages until a communication path is established between the AP and the electronic device.

Thereafter, the authenticator within the network infrastructure applies prescribed network policies that cause the newly associated electronic device to be placed into a provisioning role where access to the network resources is partially or completely restricted (blocks 410 and 420). For instance, according to one embodiment set forth in the disclosure, the authenticator may adhere to a policy of "device fingerprinting" as described above. During device fingerprinting, the authenticator is responsible for monitoring messages transmitted to the network infrastructure by the electronic device to determine if the electronic device should be placed into a provisioning role.

If the electronic device has been assigned a provisioning role, namely the device is partially or completely restricted from accessing network resources 150, any messages from the electronic device are redirected to a Captive Portal instance (blocks 430 and 440). More specifically, in response to a subsequent message (e.g., HTTP Get Request) from the electronic device, the authenticator redirects the message to the Captive Portal provided by the authentication system, which analyzes the message to determine the device characteristics for electronic device and infer its capabilities as set forth in the Provisioning Stage.

B. Provisioning Stage

Figure 5:
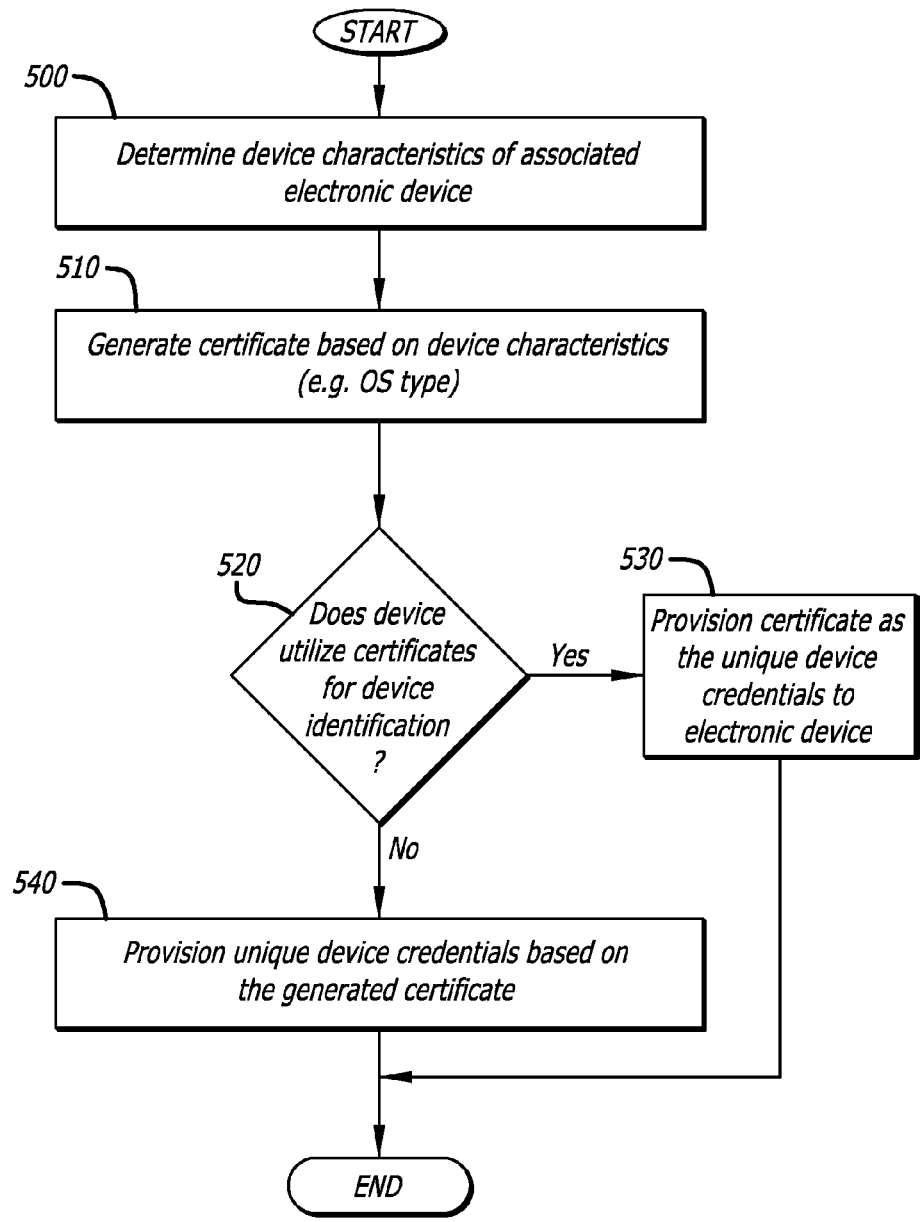
FIG. 5 is an exemplary flow diagram of the operations for the device credential provisioning as performed by an electronic device in FIG. 1.

Referring now to FIG. 5, based on device specific information forwarded by the authenticator (e.g., controller, switch and/or router, etc.), the provisioning logic within the authentication system determines the device type and/or capabilities of the electronic device (block 500). For instance, the provisioning logic may receive the device specification information that identifies the electronic device as having a particular operating system (OS) and perhaps version number, such as an Android® OS v4.0.3, thereby denoting the electronic device an Android® based mobile device. Additionally, the authentication system causes a digital certificate to be generated for the electronic device (block 510).

According to one embodiment of the invention, as shown in FIG. 1, authentication system 130 may be adapted with certificate authority logic 280 that generates a digital certificate and maps the same with a particular electronic device. Of course, it is contemplated that authentication system 130 may be implemented with intermediary logic that procures digital certificates from an external certificate authority.

Referring back to FIG. 5, based on the detected device characteristics, the provisioning logic within the authentication system determines if the requesting electronic device supports a certificate-based authentication (block 520). For instance, this determination checks whether the electronic device supports EAP-TLS (Extensible Authentication Protocol-Transport Layer Security) natively, and if so, the provisioning logic within the authentication system provides the generated digital certificate to the electronic device for identification and subsequent authentication (block 530).

If the electronic device supports an authentication protocol based on username and password (e.g., PEAP, EAP-MD5, EAP-GTC, etc.) instead of a certificate-based authentication protocol, the provisioning logic of the authentication system provides unique device credentials in the form of a username and password that are derived from portions of the digital certificate (block 540).

As an illustrative example, the username may be derived from a unique element of the digital certificate. According to one embodiment of the invention, the username may be derived from the certificate serial number. According to another embodiment of the invention, the username may be derived from the certificate serial number combined with a prescribed string of alphanumeric to form a unique username. According to yet another embodiment of the invention, the username may be derived from another piece of information unique to the digital certificate such as a Distinguished Name parameter.

Additionally, the cryptographically secure password is based on a private key within the digital certificate. According to one embodiment of the invention, the provisioning logic may perform one-way hash operation (e.g. MD5, SHA-1) on the private key to produce a result that is utilized as the password. According to another embodiment of the invention, the private key may undergo one or more logical operations (e.g. AND, OR, Exclusive OR "XOR", etc.) with other data from the digital certificate, and thereafter performs a hash operation on the resultant data to produce the unique password.

Figure 6A:
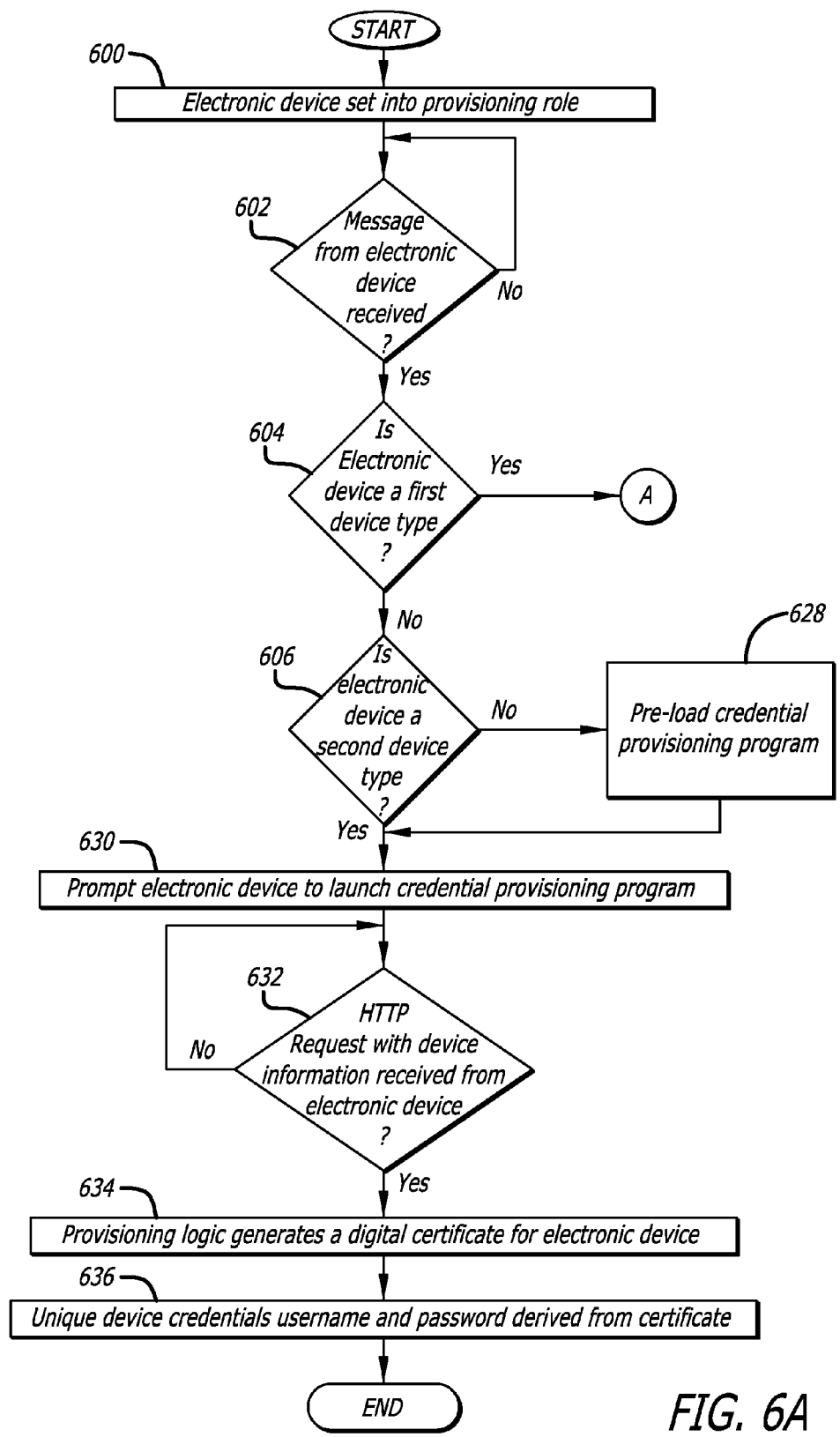
FIG. 6A is an exemplary flow diagram for assigning a unique device credential for multiple types of electronic devices.
Figure 6B:
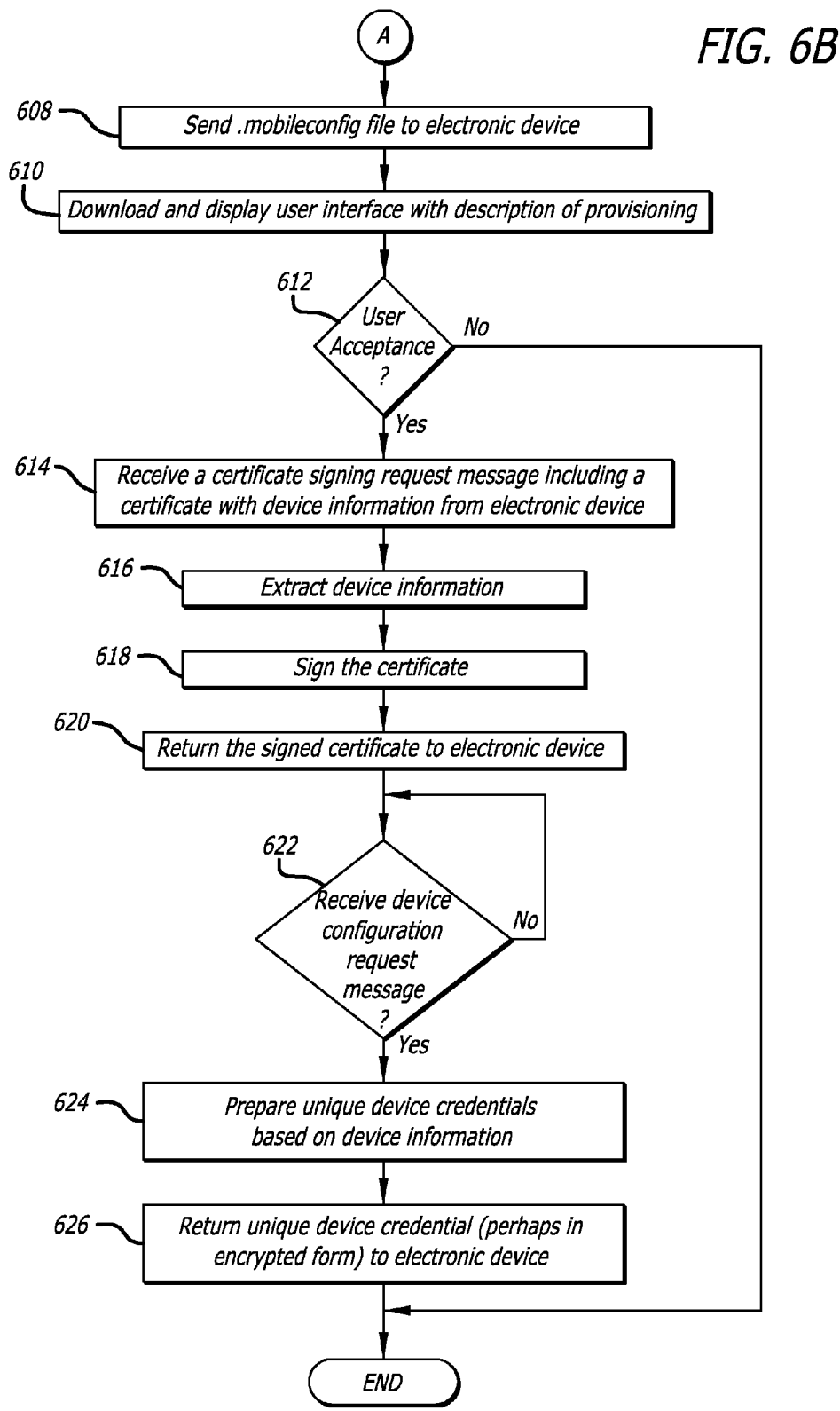
FIG. 6B is an exemplary flow diagram for assigning that unique device credential for an electronic device of a first type.

Specific examples of various provisioning schemes are illustrated in more detail in FIGS. 6A-6B.

Referring to FIGS. 6A and 6B, exemplary flowcharts illustrating a device credential provisioning scheme performed by an electronic device implemented with certain device characteristics (e.g., a first type of operating system such as Apple® iOS™) are shown. In general, unique device credentials are provisioned through generation of a digital certificate for the electronic device seeking to join a network and configuration of the electronic device to perform authentication under a secure certificate authentication protocol such as EAP-TLS for example.

More specifically, as illustrated in FIGS. 6A and 6B, electronic device has been set into a provisioning role (block 600). In response to a message from the electronic device (block 602), the authentication system determines whether the electronic device features certain device characteristics that categorize the electronic device as a first device type as represented in block 604 (e.g., device supporting the first OS type), and thereafter, sends a file having a particular format to the electronic device (block 608). This file, hereinafter referred to as the ".MobileConfig file," is configured to cause the electronic device, after display of a general description of upcoming provisioning operation along with preferred user acceptance before continuing (blocks 610 and 612), to contact a targeted server and provide the targeted server with particular device information (e.g., serial number, device type, product version, MAC address, etc.) for enrollment onto the network. The .MobileConfig file may be signed for verification of its origination from a trusted source.

More specifically, after the user agrees to the transfer of the device information, the electronic device launches a SCEP (Simple Certificate Enrollment Protocol) where the electronic device generates a certificate signing request (CSR), which comprises a certificate including the device information. The electronic device transmits the CSR to the authentication system (block 614). The authentication system extracts the device information (block 616), signs the certificate (block 618), and returns the signed certificate (referred to as the "SCEP certificate") to the electronic device (block 620). Now, the device is in possession of a digital certificate (SCEP certificate) signed by a certification authority utilized by the network, which can be used by the electronic device for identification.

Upon receiving the signed SCEP certificate, the electronic device enters into a final enrollment stage by issuing a Device Configuration Request message along with the SCEP certificate to the provisioning logic of the authentication system (block 622). The "Device Configuration Request message" is a message that requests unique device credentials. According to one embodiment of the invention, the unique device credentials include appropriate network settings (e.g., WiFi™ settings, email settings, URL links, icons, etc.) that are generated and provided by the provisioning logic based on the device information provided as well as information (e.g., TLS client certificate, BSSIDs, etc.) to perform EAP-TLS authentication (blocks 624 and 626). The unique device certificate may be encrypted (and readable only by the electronic device) in order to ensure security of such information.

Referring back to FIG. 6A, upon determining that the electronic device features device characteristics associated with a second device type (e.g. a different operating system such as Windows® or MAC OS® X) as shown in block 606, the authentication system prompts the electronic device to launch a credential provisioning program (e.g. enhanced version of QuickConnect™ by Aruba Networks, Inc.) that now provides an additional ability of customizing the network settings for each particular device instead of a uniform customization (block 630). If not, where the electronic device is a third device type having other capabilities (e.g., an Android® based smart phone), credential provisioning program may be pre-loaded into internal memory of electronic device or accessible through Captive Portal (block 628).

According to one embodiment of the disclosure, credential provisioning program sends an HTTP request message along with device information for the electronic device to the provisioning logic (block 632). The provisioning logic generates a digital certificate to correspond to the electronic device and derives the unique device credentials from the certificate (blocks 634 & 636). This derivation is designed so that the unique device credentials, namely a username and password combination, is produced from the digital certificate. As a result, the unique device credentials may be revoked in response to revocation of the digital certificate upon which these credentials are based. Moreover, there is no secondary storage necessary for the username and password for authentication purposes.

Figure 7:
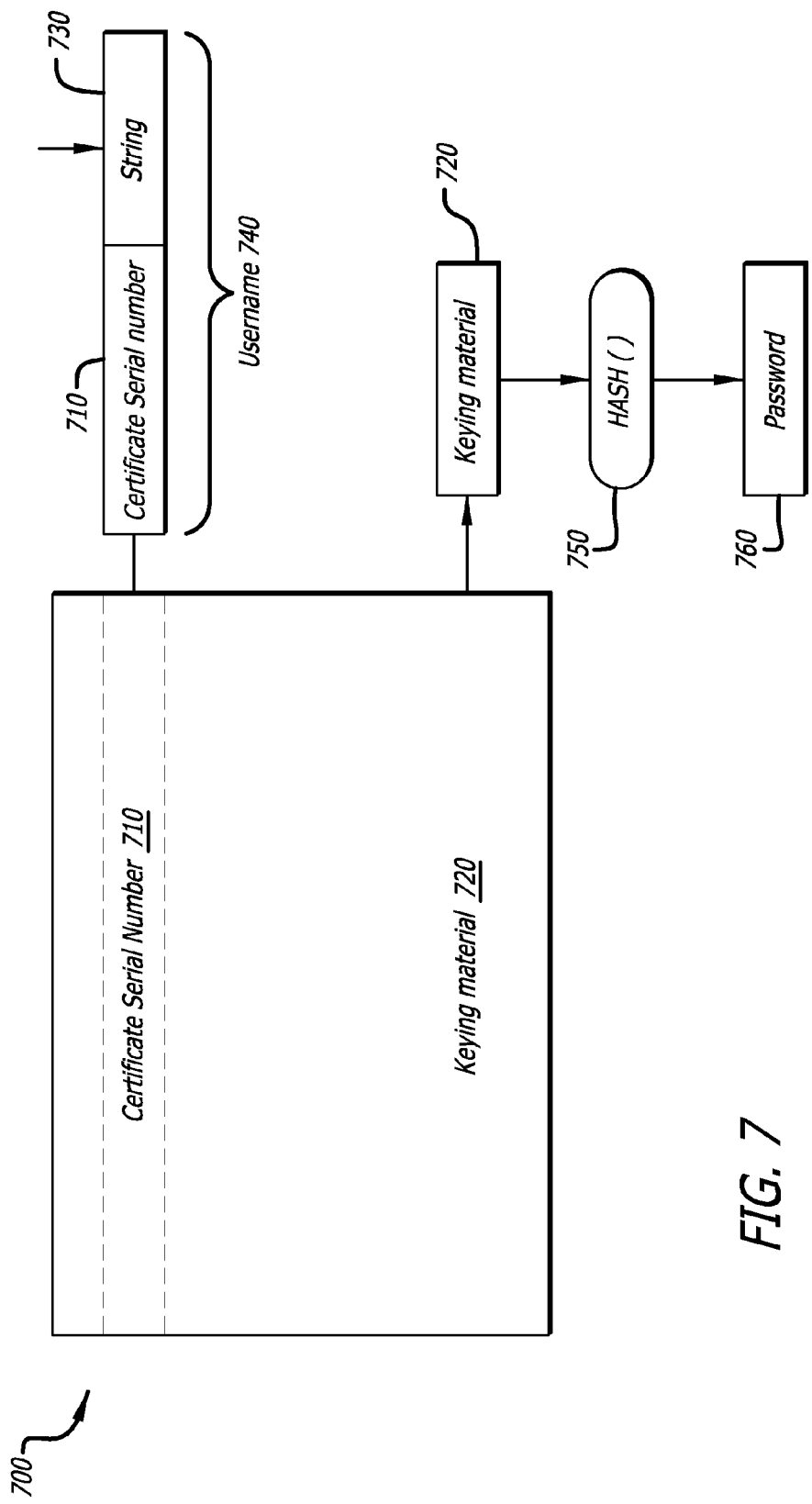
FIG. 7 is an exemplary embodiment of a digital certificate.

As shown in FIG. 7, a digital certificate 700 comprises a plurality of information elements that are unique to this particular certificate. For instance, digital certificate 700 includes a certificate serial number 710 and keying material 720 (e.g., private key), both of which are unique to digital certificate 700. As shown, a separate string of alphanumeric characters 730 may be appended to certificate serial number 710 (or alternatively a portion or derivation of certificate serial number) to form a unique username 740.

Additionally, keying material 720 from digital certificate 700 may be extracted and uniquely altered to form the password. For example, keying material 720 may undergo a one-way hash operation 750, such as Message Digest 5 (MD5) or SHA-1 for example, to produce a result that is utilized as the password 760. According to another embodiment of the invention, keying material 720 may undergo a logical operation (e.g. AND, OR, Exclusive OR "XOR", NOR, etc.) with other data from digital certificate 700, and thereafter, the resultant data undergoes a hash operation to produce the unique password.

The username and password are provided as device credentials to the electronic device with device characteristics consistent with the second device type for use in a username/password based authentication protocol.

Lastly, referring back to FIG. 6A, if the electronic device features device characteristics associated with a third device type (e.g. implemented with a third type of operating system such as Android® OS™), the provisioning logic of the authentication system performs an additional operation. The reason is that, for Windows® and MAC OS® X platforms, from the web browser, a program can be selected for download and run. For electronic devices with the Android® OS, however, the credential provisioning program needs to be pre-loaded before it can be run. For instance, a small MIME type file can be loaded onto the Android® device that is registered with the QuickConnect™ application on the phone. The browser then starts the QuickConnect™ application, which proceeds to obtain the unique device credential(s) from the provisioning logic as set forth in operations 630-636.

C. Device Authentication Stage

Figure 8:
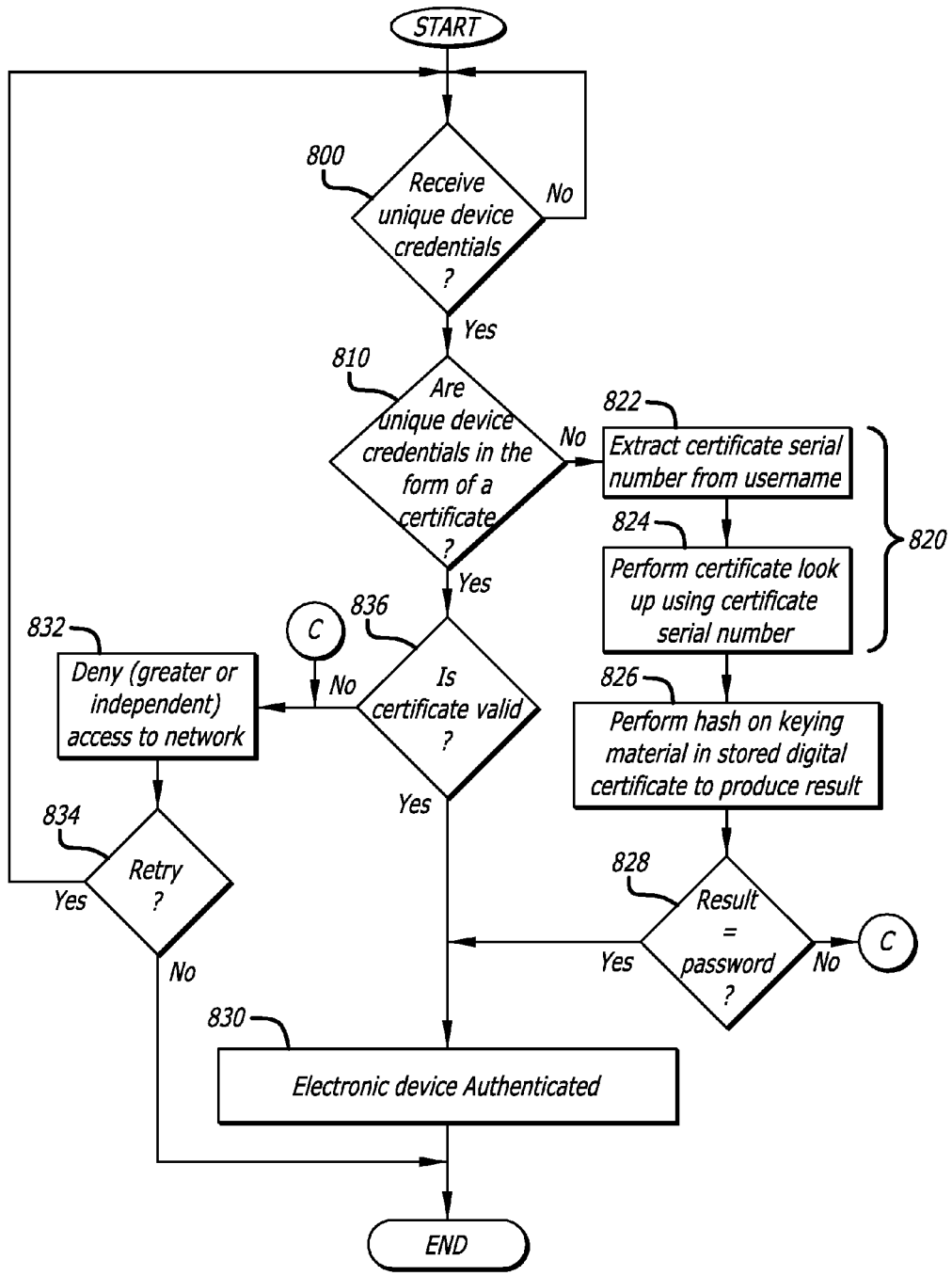
FIG. 8 is an exemplary flowchart of port-based network access control supporting device credential authentication.

Referring to FIG. 8, when attempting to join a network, the provisioned electronic device provides unique device credential(s) as part of a message to join the network (block 800). Upon receiving unique device credentials, authentication logic within the authentication system determines if the credential(s) are in the form of a digital certificate (block 810). If not, as the unique device credential(s) may be in the form of a username and password, the username is used to locate the stored digital certificate issued for the electronic device (block 820).

According to one embodiment of the invention, this may be conducted by extracting the certificate serial number from the username (block 822) and performing a lookup of stored, active (non-revoked) digital certificates (block 824). Thereafter, the keying material from the stored digital certificate may undergo a hash operation to produce a result (block 826). Next, the authentication logic compares the result with the password (block 828), and if a match is detected, the electronic device is authenticated (block 830). If not, access to the network is denied (block 832). The authentication process may be configured to allow for retries (e.g., unlimited retries, only "q" (q≧1) retries as set by administrator, etc.) as set forth in block 834.

Where the unique device credential(s) is a certificate, the digital certificate may also be checked to determine if it has been revoked, where the certificate authority controls access to the network through certificate revocation. For instance, if the digital certificate matches the stored list of active digital certificates (block 836), the electronic device is authenticated and assigned network privileges that control the amount of access the user of the device has to network resources. Otherwise, the electronic device is not authenticated so that the electronic device still remains in its provisioning role where communications are intercepted by Captive Portal so access to the network is limited to such connections (block 832). Of course, the electronic device may be prompted to retry the authentication process if retries are permitted (block 834).

The authentication process also provides an ability to revoke a certificate through a revocation list or OCSP (online certificate status protocol) that allows the authentication logic to check with an updated remote source whether the certificate has been revoked. It is contemplated that additional operations may be performed in response to a determination that the digital certificate has been revoked. As an example, the authentication system may return signaling to the electronic device to enter into an inoperable state or activate its radio in order to determine its geographic location.

Figure 9:
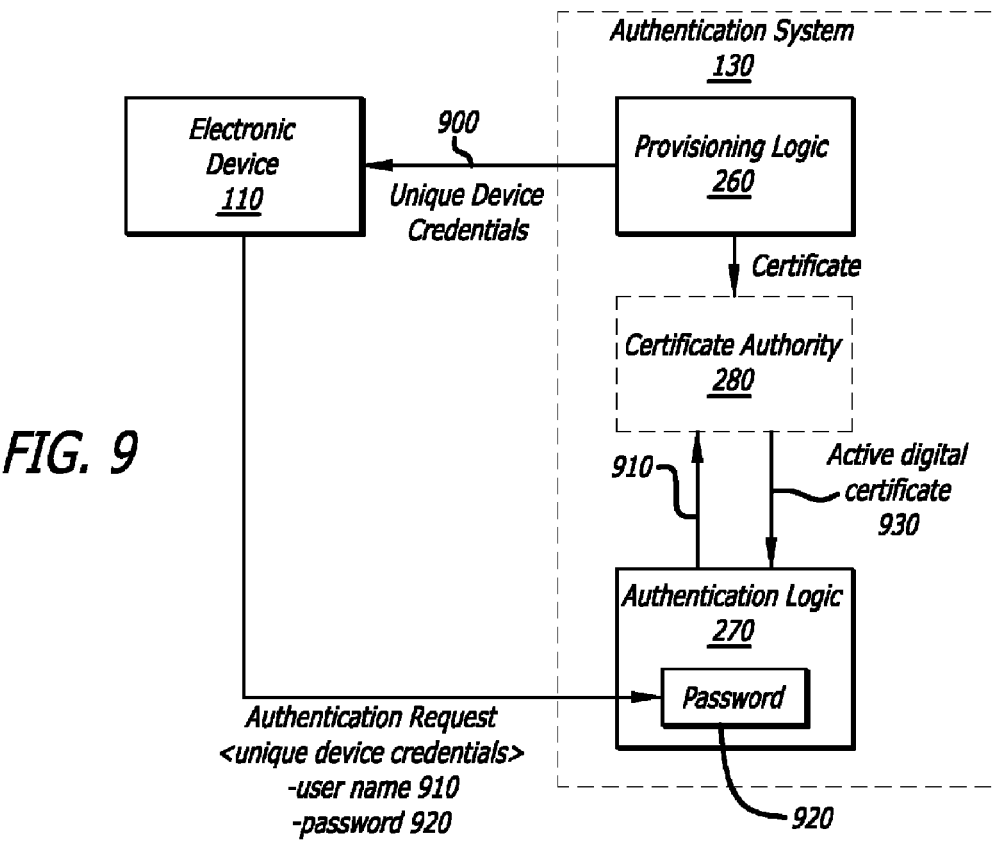
FIG. 9 is an exemplary flow diagram of the operations for authentication system supporting device credential provisioning and authentication.

Referring now to FIG. 9, an exemplary flow diagram of the operations for authentication system 130 supporting the device credential provisioning and authentication are shown. Herein, authentication system 130 comprises provisioning logic 260, authentication logic 270 and an optional certificate authority 280. In particular, certificate authority 280 may be adapted within authentication system 130 or may operate as an intermediary to procure a digital certificate from a remotely located certificate provider.

Upon determining device characteristics for electronic device 110 as described above, provisioning logic 260 provides unique device credential(s) 900 to electronic device 110. The device credential(s) 900 is(are) unique to electronic device 110 and may have a different format depending on the type of authentication protocol supported (e.g. certificate when certificate-based authentication is supported, username/password authentication where password based authentication is supported, etc.).

Upon receiving unique device credential(s) 900, electronic device 110 uses these credentials when attempting to join the network whose access is controlled by authentication system 130. Unique device credential(s) 900 not only identify electronic device 110 but also can be used to identify the level of network access provided to the user of electronic device 110.

During authentication, electronic device 110 sends an Authentication Request, including unique device credential(s) 900, to authentication logic 270 of authentication system 130. If unique device credentials 900 include a username 910 and password 920, these parameters are used to (i) attempt to locate the stored, active digital certificate 930 in certificate authority 280 from which the credentials are based, and if located, (ii) determine if password matches unique information contained herein. If a match is detected, as the unique device credentials are formed from particular information within the digital certificate as described above, then the electronic device has been authenticated and is provided unsupervised access to the network.

However, if unique device credential(s) 900 includes a digital certificate (not shown), this certificate is compared to active certificates accessible by authentication logic 270. Alternatively, a comparison may be performed by reviewing the revocation list stored in the authentication system and/or a revocation list stored remotely via OCSP (Online Certificate Status Protocol). This allows authentication logic 270 to check updated status on whether the certificate has been revoked.

Figure 10:
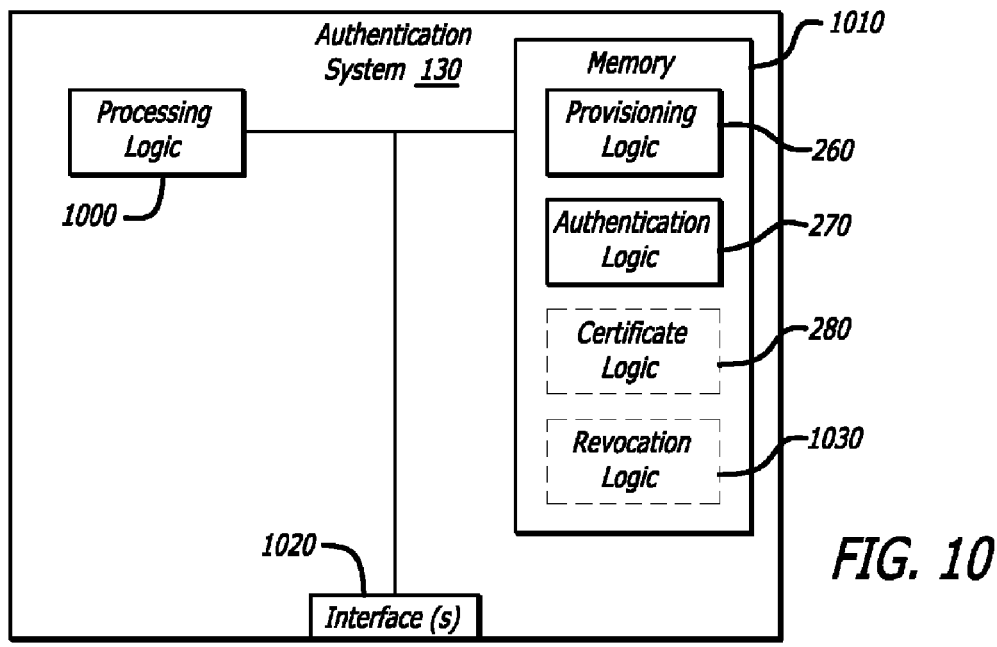
FIG. 10 is an exemplary block diagram of a network device supporting device credential provisioning and authentication.

Referring to FIG. 10, an exemplary block diagram of authentication system 130, which is implemented with provisioning logic 260 and authentication logic 270 and may be formulated with one or more electronic devices, is shown. Herein, authentication system 130 is an electronic device that comprises processing circuitry 1000, memory 1010 and one or more interfaces 1020 that are adapted to transmit and receive communications from other network devices. For instance, interface 1020 may be an antenna unit for transmitting and/or receiving wireless signals from other network devices. Additionally, or in the alternative, interface 1020 may be implemented as a physical interface including one or more ports for wired connectors.

As shown in FIG. 10, processing circuitry 1000 is coupled to memory 1010 to upload for execution provisioning logic 260 stored in memory 1010. Provisioning logic 260 is configured to control the provisioning of unique device credential(s) to one or more requesting electronic devices while authentication logic 270 (and optionally certificate authority logic 280) is configured to authenticate an electronic device requesting to join the network as described above. Similarly, revocation logic 1030 is responsible for digital certificate revocation which, when performed, restricts and/or precludes network access by an electronic device that previously relied on the digital certificate or information associated with the digital certificate (e.g. username and/or password) for access to the network. This involves a comparison of the digital certificate associated with the electronic device to contents of a revocation list stored in authentication system 130 and/or a revocation list stored remotely via OCSP.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining one or more device characteristics of an electronic device seeking to join a network;
   selecting a procedure of a plurality of procedures for generating one or more unique device credentials for the electronic device based on the one or more device characteristics of the electronic device, the selecting operation comprises:
   determining whether the electronic device supports a certificate-based authentication protocol based on the one or more device characteristics of the electronic device,
   responsive to determining that the electronic device supports the certificate-based authentication protocol, selecting a first procedure that generates at least a digital certificate as the one or more unique device credentials for sending to the electronic device,
   responsive to determining that the electronic device does not support the certificate-based authentication protocol, selecting a second procedure that generates at least one or more unique device credentials, for sending to the electronic device, other than the digital certificate;
   generating the one or more unique device credentials for the electronic device using the selected procedure;
   wherein the method is performed by a second device comprising a hardware processor.

2. The method of claim 1 further comprising sending the one or more unique device credentials to the electronic device for use in authenticating the electronic device.

3. The method of claim 1, wherein the second procedure comprises: (a) generating the digital certificate (b) generating a user name from the digital certificate, and (c) selecting the user name as a first unique device credential for sending to the electronic device.

4. The method of claim 3, wherein the user name is based on a certificate serial number uniquely assigned to the digital certificate.

5. The method of claim 3, wherein the second procedure further comprises generating a password from the digital certificate and selecting the password as a second unique device credential for sending to the electronic device.

6. The method of claim 5, wherein the password is based on keying material unique to the digital certificate.

7. The method of claim 1, wherein the one or more device characteristics indicate an operating system platform implemented by the electronic device, and wherein the procedure is selected based on the operating system platform implemented by the electronic device.

8. The method of claim 1, further comprising:
receiving an authentication request message from the electronic device to request authentication of the electronic device, the authentication request message comprises the one or more unique device credentials;
using the user name within the one or more unique device credentials to locate a stored digital certificate and using the password within the one or more unique device credentials to authenticate the electronic device to allow the electronic device to access network resources.

9. The method of claim 1, wherein the determining of the one or more device characteristics of the electronic device seeking to join the network comprises analyzing contents within a Dynamic Host Configuration Protocol (DHCP) Options field of a DHCP Discovery message.

10. A non-transitory computer readable medium comprising instructions which, when executed by one or more processor, performs operations comprising:
determining one or more device characteristics of an electronic device seeking to join a network;
selecting a procedure of a plurality of procedures for generating one or more unique device credentials for the electronic device based on the one or more device characteristics of the electronic device, the selecting operation comprises:
determining whether the electronic device supports a certificate-based authentication protocol based on the one or more device characteristics of the electronic device,
responsive to determining that the electronic device supports the certificate-based authentication protocol, selecting a first procedure that generates at least a digital certificate as the one or more unique device credentials for sending to the electronic device,
responsive to determining that the electronic device does not support the certificate-based authentication protocol, selecting a second procedure that generates at least one or more unique device credentials, for sending to the electronic device, other than the digital certificate;
generating the one or more unique device credentials for the electronic device using the selected procedure.

11. The computer readable medium of claim 10, wherein the operations further comprise sending the one or more unique device credentials to the electronic device for use in authenticating the electronic device.

12. The computer readable medium of claim 10, wherein the second procedure comprises: (a) generating the digital certificate (b) generating a user name from the digital certificate, and (c) selecting the user name as a first unique device credential for sending to the electronic device.

13. The computer readable medium of claim 12, wherein the user name is based on a certificate serial number uniquely assigned to the digital certificate.

14. The computer readable medium of claim 12, wherein the second procedure further comprises generating a password from the digital certificate and selecting the password as a second unique device credential for sending to the electronic device.

15. The computer readable medium of claim 14, wherein the password is based on keying material unique to the digital certificate.

16. The computer readable medium of claim 10, wherein the one or more device characteristics indicate an operating system platform implemented by the electronic device, and wherein the procedure is selected based on the operating system platform implemented by the electronic device.

17. The computer readable medium of claim 10, wherein the operations further comprise:
receiving an authentication request message from the electronic device to request authentication of the electronic device, the authentication request message comprises the one or more unique device credentials;
using the user name within the one or more unique device credentials to locate a stored digital certificate and using the password within the one or more unique device credentials to authenticate the electronic device to allow the electronic device to access network resources.

18. The computer readable medium of claim 10, wherein the determining of the one or more device characteristics of the electronic device seeking to join the network comprises analyzing contents within a Dynamic Host Configuration Protocol (DHCP) Options field of a DHCP Discovery message.

19. A first electronic device comprising:
one or more hardware processors;
a computer readable storage medium comprising instructions which, when executed by the one or more hardware processors, cause performance of operations comprising:
determining one or more device characteristics of a second electronic device seeking to join a network;
selecting a procedure of a plurality of procedures for generating one or more unique device credentials for the second electronic device based on the one or more device characteristics of the second electronic device, the selecting operation comprises:
determining whether the second electronic device supports a certificate-based authentication protocol based on the one or more device characteristics of the second electronic device,
responsive to determining that the second electronic device supports the certificate-based authentication protocol, selecting a first procedure that generates at least a digital certificate as the one or more unique device credentials for sending to the second electronic device,
responsive to determining that the second electronic device does not support the certificate-based authentication protocol, selecting a second procedure that generates at least one or more unique device credentials, for sending to the second electronic device, other than the digital certificate;
generating the one or more unique device credentials for the second electronic device using the selected procedure.

20. The first electronic device of claim 19, wherein the operations further comprise sending the one or more unique device credentials to the second electronic device for use in authenticating the second electronic device.

21. The first electronic device of claim 19, wherein the second procedure comprises: (a) generating the digital certificate, (b) generating a user name from the digital certificate, and (c) selecting the user name as a first unique device credential for sending to the second electronic device.

22. The first electronic device of claim 21, wherein the user name is based on a certificate serial number uniquely assigned to the digital certificate.

23. The first electronic device of claim 21, wherein the second procedure further comprises generating a password from the digital certificate and selecting the password as a second unique device credential for sending to the second electronic device.

24. The first electronic device of claim 23, wherein the password is based on keying material unique to the digital certificate.

25. The first electronic device of claim 19, wherein the one or more device characteristics indicate an operating system platform implemented by the second electronic device, and wherein the procedure is selected based on the operating system platform implemented by the second electronic device.

26. The first electronic device of claim 19, wherein the operations further comprise:

receiving an authentication request message from the second electronic device to request authentication of the second electronic device, the authentication request message comprises the one or more unique device credentials;

using the user name within the one or more unique device credentials to locate a stored digital certificate and using the password within the one or more unique device credentials to authenticate the second electronic device to allow the second electronic device to access network resources.

27. The first electronic device of claim 19, wherein the determining of the one or more device characteristics of the second electronic device seeking to join the network comprises analyzing contents within a Dynamic Host Configuration Protocol (DHCP) Options field of a DHCP Discovery message.

* * * * *